United States Patent Office 3,496,784
Patented Feb. 24, 1970

3,496,784
CONVEYOR CHAIN LINK
Alfred Freeman, 94 Orlingbury Road,
Isham, Northamptonshire, England
Filed Jan. 3, 1968, Ser. No. 695,424
Int. Cl. F16g 13/02, 13/18
U.S. Cl. 74—250        6 Claims

ABSTRACT OF THE DISCLOSURE

A quickly-removed and quickly-inserted link for a conveyor chain consists of a bush with hook-ended arms extending from opposite sides, each hook being closed under compression by an embracing piece.

---

Figure 1:
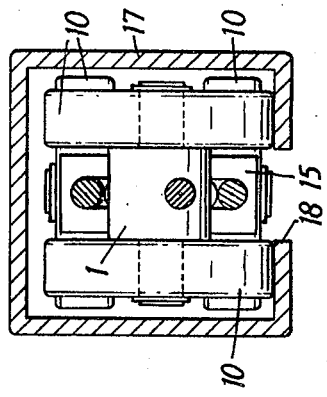

The forms of links used as components of chains are many and various. Where the chains are used in conveyors and are subject to heavy stresses and strains, as for example in the case of overhead conveyor chains from which loads are slung, there is a premium on the tensile strength of the chain and the links are usually of a robust metal construction and firmly closed, e.g. by welding, to inhibit the loops opening under working strains.

This, however, involves complication and time in fabrication and assembly of the chain, and it is an object of the present invention to prescribe a form of conveyor chain link which can be assembled quickly in a link chain, or equally quickly detached therefrom, without loss of tensile strength in the chain—indeed, possibly with some increase in this strength. Such facility for replacement of the link can, moreover, be used to cater for quick substitution of different forms of, say, work carriers, permanently attached to links in the chain, varying the number of such work carriers in a particular length of chain, and so on.

The link devised to these ends in accordance with this invention comprises a bush, a length of hard springy material extending as an arm from each of two opposite sides of said bush and turned back as a U to form a hook, and an embracing piece threaded on the U of each hook to hold the same under compression.

Advantageously the two arms are made from a single length of tempered steel rod which is turned back at its ends to form the hooks and is secured to the bush between these hooks. Thus a link, separated from a chain of links, will have its end hooks open and an embracing piece such as an apertured plate threaded loosely on each of the two arms. It can quickly be connected between two adjacent closed but separate links of a chain by hooking one of its open loops round the end loop of one of these adjacent links, compressing the open loop by powerful grippers, or in a press tool, slipping the free aperture of the closure plate onto the free end of the rod, and relaxing the tool pressure. The spring bias of the parts of the loop which have just been closed will provide a closed system of forces through the closure plate and this end loop of the link will thus be closed under compression and be resistant to reopening on any subsequent pull or other stress on the chain at this part.

Repetition of the procedure between the other end loop of the link and the other adjacent end link of the chain completes the insertion of the new link. The link can be removed in a similarly facile fashion.

As will be appreciated, there is a portion of each link which is left open at one side of the bush, i.e. the gap between the two free ends of the loops. When in cases where a very heavy strain is placed on the chain, for example when heavy loads are transported, or a very long chain has to be pulled, there may be a tendency to open the individual links, i.e. to deform and open up. To combat any tendency of this sort, in accordance with a further feature of the invention the link may additionally include an auxiliary member which is detachably engaged by said apertured plates so as to bridge the gap between the free ends of said hooks and resist opening of this gap under the strain of a pull on the end loops of the link.

The auxiliary member may, in the particular link described above, be an interrupted loop of tempered steel rod which is arranged in juxtaposition with the main hook arms but with the interruption therein at the opposite side of the bush to the gap between the free ends of the main hook arms, and in which each of the compression plates is apertured to thread over juxtaposed limbs of the main arms and the auxiliary bridging member.

The novel link constructions can be applied to various forms of conveyor chain, for example to simple chains. They are, however, particularly suitable as applied to conveyor chains from which load carriers depend directly. Thus, for instance, in some cases certain of the links may have depending rods, hooks, or other devices supporting trays or other work holders. These depending devices may be permanently or detachably secured to the links concerned, e.g. be welded to the bushes.

The links constructed in accordance with this invention are also applicable with success on conveyor chains of the type having wheel sets running along a trackway of the system. In cases of this sort, the bush referred to above may be formed to provide, or carry, the wheel axles.

Figure 2:
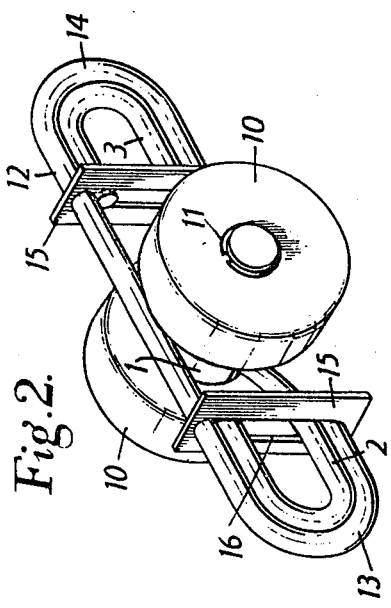
Figure 3:
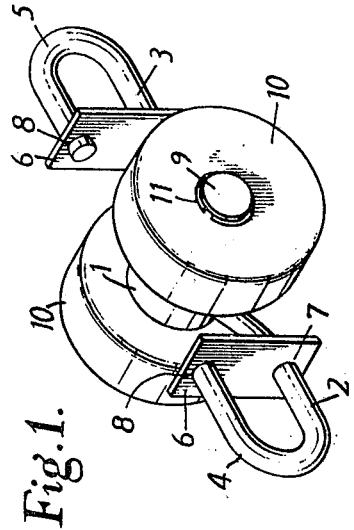
Figure 4:
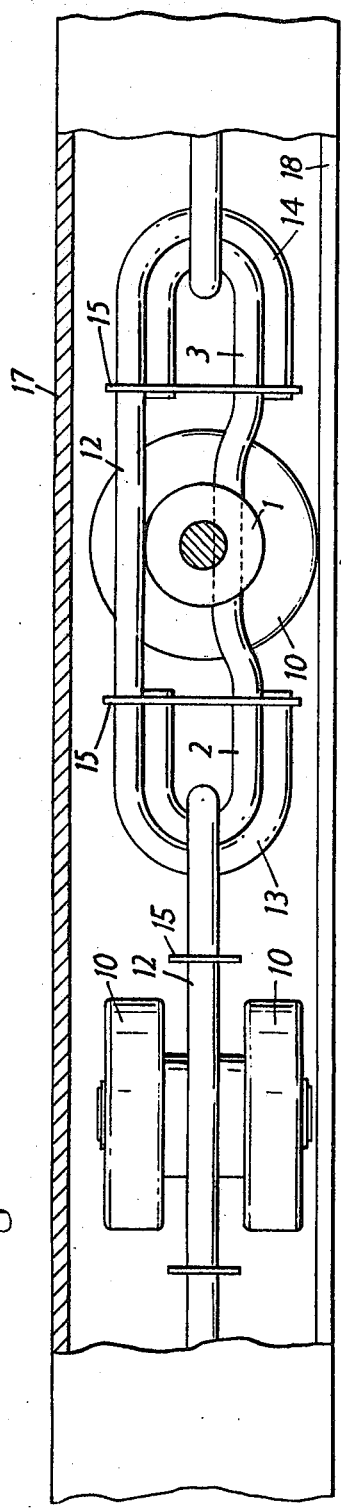

Two forms of chain link in accordance with the invention are illustrated in the accompanying drawings, in which:

FIGURE 1 is a perspective illustration of a first form of link,
FIGURE 2 is a similar illustration of a second form,
FIGURE 3 is a side elevation, partly in section of links of the form shown in FIGURE 2, incorporated in a conveyor, and
FIGURE 4 is a transverse cross section through the arrangement illustrated in FIGURE 3.

The link illustrated in FIGURE 1 comprises a bush 1 in the form of a cylindrical piece of steel which is diametrically drilled and has a length of spring tempered steel rod which is passed the drilling so as to present two arms 2 and 3 extending symmetrically from opposite sides of the bush. Each of the arms 2 and 3 is cranked adjacent the bush 1 and has its end doubled back to form a loop 4 and 5 respectively, of U-shape. The axis of the loops 4 and 5, i.e. of the hooks provided by the arms 2 and 3 run centrally through the bush 1 so that the pull of the link, when incorporated in a chain, will be centralised in the bush.

Threaded on each of these arms is a rectangular plate 6, also of tempered steel, which is furnished with two spaced apertures 7 and 8 of a diameter slightly in excess of the rod diameter. One of these apertures (7) is initially threaded on the rod and is loosely slidable along the latter. To close the loop, for the purpose described above, it is compressed by a pair of powerful grippers and the plate 6 manipulated so that the aperture 8 therein can be engaged over the free end of the arm or loop 4 or 5, as illustrated in the assembled condition seen in FIGURE 1. Conveniently a groove may be provided around the ends of loops 4 and 5 to receive and locate the defining rim of apertures 8.

Release of the pressure of the grippers allows the spring action of the steel arm to re-assert itself, whereby a compressive stress is applied to the now-closed loop in each case.

This closure of the loop is, of course, effected after it has been hooked over the end loop of an adjacent link, and a similar process is repeated when the overlap of the link is similarly engaged with the next adjacent link.

The link illustrated in FIGURE 1 is particularly intended for use in a conveyor when it runs in a trunking system. For this reason a bush 1 is provided with two pintles one of which is seen at 9, which may conveniently be turned from the original cylindrical piece from which the bush 1 is formed. The pintles 9 each loosely receive a guide wheel 10, for example of nylon, which can be trapped axially by a spring clip 11.

The link illustrated in FIGURES 2, 3 and 4 fulfills a similar purpose to that of FIGURE 1 and embodies the basic features of the latter. It is, however, provided with an auxiliary bridging member 12 to combat any tendency to stretching or distortion of the link of FIGURE 1 when under strain. It will be noted that the parts of the link in FIGURES 2 to 4 which have their counterpart in the link of FIGURE 1 are identified by the same reference numerals as in the latter.

The member 12 is made of the same tempered spring steel rod as the arms 2 and 3, but it will be observed that it is separate from the arms 2 and 3 and bush 1. The main stem 12 of this member is turned back at its ends to form loops 13 and 14 which will snugly embrace the loops 2 and 3, as seen in FIGURE 2.

In this case the compression plates 15 are modified since they now function to apply compressive stress to the end loops 13 and 14 of member 12. Consequently they are made somewhat longer than was the case for plates 6, and the separate apertures 7 and 8 in the latter are replaced by a longitudinal slot 16.

This enables the link to be quickly broken, e.g. for removal from the chain, despite the added presence of member 12 in the link. Similarly it allows for assembly in a chain. In the performance of the latter manoeuvre, for example, the hook 2, with plate 15 threaded thereon, is hooked into the loop of the adjoining link.

The auxiliary member 12 is then pushed through the slot 16 of this plate 15 from the opposite side of the bush 1 and twisted until the hook 13 thereof is in register with and embracing loop 2 and, in consequence, the end loop of the adjoining link. The double-ply loop 2, 13 is then compressed and the plate 15 knocked back to engage completely around it. The compression tool is then relaxed and this end of the link is now set up.

To close the other end of the double-link, the plate 15 dedicated to this end is simply slipped over the two-ply end 3, 14 and knocked in towards the bush 1. Thus we have a link which, when assembled in a chain and subject to axial pull at its ends will form a closed system of forces which will resist opening up or distortion of the link.

FIGURES 3 and 4 illustrate the link of FIGURE 2 assembled in a conveyor chain. It will be observed that the conveyor system comprises external square trunking 17 in which run the wheels 10 of the successive links in the chain. It will also be observed that each link is orientated through 90° relatively to the preceding link in known fashion. Further, the trunking 17 is provided with a longitudinal slot 18 at its lower side, this to allow the passage of depending stems which may be provided on individual links of the chain for the suspension of work or goods carriers, depending on the environment in which the conveyor is to be used.

What I claim is:
1. A link for a conveyor chain, which is of the improved form comprising a solid central boss, a length of tempered steel rod anchored in and extending from each of two opposite sides of said solid boss, said rod being cranked adjacent its point of emergence from said boss and being turned back at its free end remote from said boss to form a hook and a tie piece threaded on the U of each said hook to hold the same in compression.

2. A link for a conveyor chain according to claim 1 in which the said two lengths of rod are composed of a single length of tempered steel rod which is passed through and secured to said boss and is turned back at its ends to form said hooks, and each said tie piece is an apertured steel plate.

3. A chain link according to claim 1, further including an auxiliary member which is detachably engaged by said tie pieces so as to bridge the gap between the free ends of said hooks and resist opening of this gap under the strain of a pull on said hooks, said auxiliary bridging member being an interrupted loop of tempered steel rod which is arranged in juxtaposition with said lengths of steel rod but with the interruption therein at the opposite side of said boss to said gap, and in which each of the tie pieces in apertured to thread over juxtaposed limbs of the main rod length and the auxiliary bridging member.

4. A link for a conveyor chain, which is of the improved form comprising a steel rod in the form of an interrupted elongated and substantially parallel-side loop, interrupted along one side thereof, a tie piece loosely threaded on a pair of parallel sections of the rod defining the sides of U-shaped ends of the loop, and a solid boss secured substantially mid-way along the uninterrupted side of the loop, the sections of the loop immediately adjoining said boss being cranked.

5. A link according to claim 4, in which a second elongated and parallel-sided loop interrupted along one side is arranged around the first loop with the interruption therein at the opposite side of the link to the interruption in said first loop, and in which the tie pieces are threaded on said second loop.

6. A link for a conveyor chain, which is of the improved form comprising a bush, a length of hard springly material extending as an arm from each of two opposite sides of said bush and turned back as a U to form a hook, and an embracing piece threaded on the U of each hook to hold the same under compression, an auxiliary member detachably engaged by said apertured plates so as to bridge the gap between the free ends of said hooks and resist opening of this gap under the strain of a pull on the end hooks of the link, wherein the said auxiliary bridging member is an interrupted loop of tempered steel rod which is arranged in juxtaposition with the main hook arms but with the interruption therein at the opposite side of the bush to the gap between the free ends of the main hook arms, and in which each of the embracing pieces is apertured to thread over juxtaposed limbs of the main arms and the auxiliary bridging member.

References Cited

UNITED STATES PATENTS

| 627,892 | 6/1899 | Bartel | 59—85 X |
| 1,154,987 | 9/1915 | Goff | 59—85 |

FOREIGN PATENTS 917,597  2/1963  Great Britain.

ROBERT G. SHERIDAN, Primary Examiner

G. F. ABRAHAM, Assistant Examiner

U.S. Cl. X.R.

59—85; 198—177